United States Patent Office 2,728,687
Patented Dec. 27, 1955

2,728,687

METHOD OF IMPROVING ADHESIVE CHARACTERISTICS OF ADHESIVE TAPE AND RESULTANT ARTICLE

Jean B. Huerre, Paris-Levallois, France

No Drawing. Application September 17, 1952,
Serial No. 310,117

2 Claims. (Cl. 117—64)

This invention relates to a method of forming adhesive tapes having improved adhesive characteristics and which are to be used in conjunction with surgical dressings, together with the adhesive tapes produced by such method.

The present invention is particularly concerned with methods of forming adhesive tapes which are to be applied to the human skin, such tapes displaying a very high degree of adherence to the skin, despite the absence of natural rubber or natural resin in the adhesive coating on the tape.

Conventional adhesive tapes which are used in conjunction with surgical dressings and the like, and which are applied to the skin by means of pressure, usually contain as ingredients of the adhesive coating thereof, substantial amounts of natural rubber and natural resins. While such tapes show good adherence to the skin, it has been found that they have a deleterious affect on the skin of many individuals who may be sensitive to natural rubber or natural resins. Reported cases of undesirable skin reactions accruing from the use of such tapes, are increasing in number.

As a solution to the problem, it has been proposed to use tapes having adhesive coatings devoid of natural rubber and natural resins. While such tapes eliminate possibilities of skin irritation and intolerance, the adherence of the tapes to the human skin is of a low order. It is thus necessary to apply substantial pressure for extended time intervals in order to obtain even a minimum amount of adhesion of the tape to the skin. This obviously interferes with the quick application of surgical dressings and is quite disadvantageous in the case of emergencies.

Accordingly, an object of this invention is to provide an improved method of making adhesive tapes for use with surgical dressings wherein the adhesive coating on the tape is free of natural rubber, natural resins or other ingredients which may irritate the skin, such coating being applied in a manner to provide in the resultant tape the ability to adhere tightly to the human skin with the use of slight pressure.

A further object of this invention is to provide an improved method of forming adhesive tapes wherein the adhesive coating thereof is free of natural rubber and natural resins, the coating being in a compressed condition whereby to develop the maximum adhesive characteristics thereof.

Another object of this invention is to provide an improved adhesive tape including a base having a coating applied thereto which includes synthetic resins or plastics and synthetic elastomers, together with plasticizers and inert fillers, the coated tape being treated to compress the coating as by pressing the coating against a smooth, highly finished surface thereby developing the pressure sensitivity and adhesion characteristics of the coating to a high order.

Other objects of this invention will in part be obvious and in part hereinafter pointed out.

In accordance with the instant invention, a tape backing strip which may be of fabric or the like, has applied to one surface thereof a coating which is free of natural rubber and natural resins, and contains as ingredients thereof, a synthetic resin, a synthetic elastomer, plasticizers and inert filler. Such coating may be applied to the base strip as a plastic mass by means of a calendar or the like, or may be compounded with suitable solvents and applied by suitable coating means.

The thus formed tape is activated to a condition of good adhesion by pressing the coated surface of the tape against a smooth, highly finished or glazed surface and compacting or compressing the coating. Thus, the back side of the tape may be coated with a synthetic resin, plastic material or other suitable material which will provide a smooth, glossy, highly finished surface. Upon rolling the tape under tension, the adhesive coating will press against facing, glossy surface portions of adjacent convolutions. The resultant pressure compacts the adhesive coating under conditions which increase the adhesion values of the tape and makes the same especially useful in connection with the application of surgical dressings. It has been found that upon unrolling the tape and pressing the coated surface against the skin at body temperature, quick adhesion is obtained with a minimum amount of pressure.

In lieu of the integrated glossy coating on the back of the tape, a separate, removable highly finished surface may be used for compacting and compressing the adhesive coating, to improve the adhesion characteristics thereof. Thus, smooth, highly finished materials derived from metal foils, synthetic resins, plastic materials, and the like, may be interleaved with the convolutions of the coated tap and placed in pressure contact with the coated surface thereof, by suitably tensioning the convolutions of wound material, or the like.

By way of illustration, a fabric tape base was coated on one surface thereof with a composition made up of from 700 to 900 parts of polyvinyl acetal, 1000 parts of styrene-isobutylene copolymer, 200 to 300 parts of calcium carbonate and 900 parts of octyl phthalate, all by weight. The opposite surface of the tape was coated with a copolymer of vinyl acetate and vinyl chloride to provide a highly finished, glossy surface. The tape thus produced was tightly wound into a roll, thus bringing the glossy tape surface into pressure contact with the adhesive surface on adjacent convolutions. On unrolling the tape, the same could be pressed against the human skin at body temperature and good adherence was obtained with minimum pressure. The use of the tape did not result in irritations or skin reactions of an undesirable nature.

Again, a tape base was coated on one surface with a composition including 800 parts of polyvinyl butyral, 1200 parts of styrene-isobutylene copolymer, 200 parts of zinc oxide, 1050 parts of butyl phthalate, 1200 parts benzene, and 800 parts trichlorethylene, all by weight. The composition was applied to the base by suitable coating means.

The tape thus produced was tightly wound together with a strip of smooth polyethylene in facing relation to the coated surface thereof, into roll form. Tape portions taken from the roll at room temperature were found to be highly adherent to the human skin and were applied with nominal pressure.

For the adhesive composition applied to the tape base, in lieu of the polyvinyl acetal or butyral, synthetic resins such as the polyvinyl esters, polyvinyl ethers or the glycerylphthalates, may be used. Isobutylene polymers may be used in place of the styrene-isobutylene copolymer.

Various plasticizers known in the art may be used in the adhesive composition, providing the selected plasticizer is a non-irritant and is tolerated by the skin. Thus, selected organic phosphates such as 2-ethylhexyldiphenyl phosphate has been found suitable, as well as phthalic esters, chlorinated aromatic derivatives, glycol derivatives and the like.

The filler used in the adhesive composition must be inert and may be of mineral or vegetable origin, including metallic oxides and salts, or the like.

In lieu of the polyethylene strip which is used to provide a smooth surface for compacting the adhesive coating on the tape, other highly finished or glazed materials may be used including cellophane, ethyl cellulose, cellulose acetate, vinyl copolymers and aluminum foil.

It will be apparent that there has been provided an improved method of forming adhesive tapes and the resultant products which are well adapted for practical use and in which the several objects of the invention are achieved.

It is understood that the examples given herein are for the purpose of illustration and are not to be deemed of limiting significance except as indicated in the claims following.

Having thus described my invention, I claim as new and desire to protect by Letters Patent:

1. The method of forming pressure sensitive surgical adhesive tape inert with respect to the human skin, comprising applying to one surface of a tape base a coating comprising by weight 700–900 parts polyvinyl acetal, 1000 to 1200 parts styrene-isobutylene copolymer, 900 to 1050 parts plasticizer and 200 to 300 parts inert filler, and pressing the coated surface of said tape base against a smooth, highly finished surface with a pressure sufficient to obtain quick adhesion of said tape when applied to the human skin at body temperature with a minimum amount of applying pressure.

2. A surgical pressure sensitive tape for application to the human skin made by the method of claim 1.

References Cited in the file of this patent

UNITED STATES PATENTS

| | | |
|---|---|---|
| 2,096,973 | Munch | Oct. 26, 1937 |
| 2,105,728 | Geller | Jan. 18, 1938 |
| 2,160,996 | Wiezevich | June 6, 1939 |
| 2,171,259 | Scott | Aug. 29, 1939 |
| 2,267,470 | Kobela et al. | Dec. 23, 1941 |
| 2,413,931 | Stamatoff | Jan. 7, 1947 |
| 2,484,045 | Morgan | Oct. 11, 1949 |
| 2,485,248 | Watson | Oct. 18, 1949 |
| 2,518,741 | Young | July 25, 1950 |
| 2,571,928 | Newberg | Oct. 16, 1951 |
| 2,616,824 | Meiler et al. | Nov. 4, 1952 |

FOREIGN PATENTS

| | | |
|---|---|---|
| 112,284 | Australia | of 1941 |